United States Patent [19]
Bodine

[11] 3,795,226
[45] Mar. 5, 1974

[54] ACOUSTICAL SUPPRESSION OF DETONATION WAVES IN ROTARY INTERNAL COMBUSTION ENGINE

[76] Inventor: Albert G. Bodine, 7877 Woodley Ave., Van Nuys, Calif. 91406

[22] Filed: June 19, 1972

[21] Appl. No.: 264,275

[52] U.S. Cl. .............................. 123/8.01, 123/191 B
[51] Int. Cl. .............................................. F02b 55/02
[58] Field of Search. 123/8.01, 8.45, 191 B; 181/48, 181/54, 59

[56] References Cited
UNITED STATES PATENTS

| | | | |
|---|---|---|---|
| 2,573,536 | 10/1951 | Bodine | 123/191 B |
| 3,063,438 | 11/1962 | Bodine | 123/191 B |
| 2,827,033 | 3/1958 | Bodine | 123/191 B |
| 3,512,907 | 5/1970 | Belzner | 123/8.45 X |

Primary Examiner—Carlton R. Croyle
Assistant Examiner—Michael Koczo, Jr
Attorney, Agent, or Firm—Sokolski, McCormack & Schaap

[57] ABSTRACT

Appropriately responsive acoustic cavity structures are provided along the surfaces of the rotor or the walls of the combustion chamber, or both, of a rotary internal combustion engine. These cavities are dimensioned and positioned to acoustically attenuate sound waves developed in connection with gas vibrations at the detonation frequencies.

7 Claims, 11 Drawing Figures

PATENTED MAR 5 1974 3,795,226

ACOUSTICAL SUPPRESSION OF DETONATION WAVES IN ROTARY INTERNAL COMBUSTION ENGINE

This invention relates to rotary internal combustion engines and more particularly to acoustic attenuator devices and techniques for suppressing the thermally generated pressure vibration patterns in this type of engine.

In my U.S. Pat. No. 2,573,536, issued Oct. 30, 1951, entitled ENGINE DETONATION CONTROL BY ACOUSTIC METHODS AND APPARATUS, a thorough teaching is provided of the overall problems involved and the theoretical considerations of suppressing the detonation vibrations generated in a piston type internal combustion engine. Others of my patents concerned with this same problem in piston engines include my U.S. Pats. No. 2,662,516, issued Dec. 15, 1963; U.S. Pat. 2,712,816 issued July 12, 1955; U.S. PAT. No. 2,760,472 issued Aug. 28, 1956; U.S. Pat No. 2,828,731 issued Apr. 1, 1958; and U.S. Pat. No. 3,456,638 issued July 22, 1969. The devices described in these various patents are designed to handle the particular characteristics of piston engine combustion chambers when detonation or similar combustion vibration occurs. Specifically, such chambers have the basic characteristic of a flat shallow cylindrical wafer of pancake shape during the combustion phase. Further, in a piston engine, the piston is relatively quiescent in its top dead center position when the combustion occurs.

It has been found that the rotary engine presents an entirely different acoustical problem which cannot be handled in the same manner as the piston engine. First, in the rotary engine the combustion chamber takes on a thin elongated pipe shape, with the gas column being terminated in the area adjacent to the rotor seals, making for a high acoustical impedance in these locations. Further, in the rotary engine, the combustion chamber is continually swept rapidly around an elongated path, the gas chamber being alternately narrowed and expanded sideways such that the chamber squeezes into a ribbon shape when the thermally generated wave occurs. Also, in the rotary engine, the gas chamber is being effectively swept along very rapidly during peak combustion as compared to the relatively quiescent piston condition in a piston engine at top dead center when the main combustion occurs. The device and technique of of this invention has taken all of these factors into consideration to provide an optimum approach to the suppression of thermally related waves in a rotary engine.

The suppression of the thermally generated waves in a rotary engine has several advantages. First, it lends to increased engine efficiency by avoiding the unnecessary dissipation of energy incidental to such sound waves. The thermally generated waves tend to cause a scrubbing effect of the chamber walls by the combustion products which contribute significant heat losses and combustion quenching with consequent incomplete combustion. Further, the heat and pressure vibrations contributed by these waves increases the wear and tear on parts, this being particularly significant in its deleterious effect on the rotor seals. Also, the suppression of these waves makes for smoother and quieter engine operation. Another advantage which accrues from the suppression of the thermally generated waves is that it tends to lessen transient peak temperatures which contribute to the emission of certain undesirable combustion products.

It is therefore an object of this invention to improve the efficiency and reduce the exhaust contaminants of the operation of rotary engines.

It is a further object of this invention to provide a device and technique for effectively suppressing thermally generated waves in rotary engines.

It is still another object of this invention to lessen the wear in the operation of rotary engines.

It is still another object of this invention to make for smoother and quieter operation of rotary engines.

Other objects of this invention will become apparent as the description proceeds in connection with the accompanying drawings, of which:

Briefly described, the invention is as follows: One or more cavities are placed along the rotor of a rotary engine. These cavities are preferably positioned in a location of high impedance of the thermally generated waves such as in the area adjacent to the rotor seals. Cavities which may be in the form of removable inserts are also installed in the chamber walls, preferably in a region thereof where the sound wave presents high acoustical impedance. The various cavities are dimensioned to provide optimum acoustical attenuation of these pressure waves.

Figure 1:
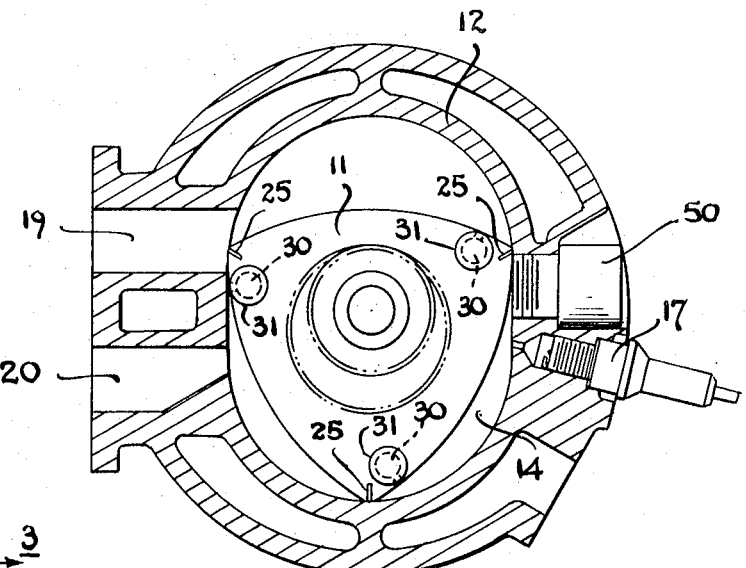
FIG. 1 is a plan view illustrating one embodiment of the invention.

Referring now to FIG. 1, one embodiment of the invention is illustrated. A rotary engine is shown having a rotor 11 which is rotatably driven around the wall of trochoidal housing 12 by the combustion gases developed in chamber 14 by virtue of the combustion of a fuel and air in the chamber which is ignited by means of spark plug 17. Intake to the chamber is provided through port 19, while exhaust is provided through port 20. Seals 25 are provided at the corners of the rotor to seal these corners against the wall of chamber 12 as the rotor rotates thereabout. The rotary engine as thus far described is well known in the art and basic concepts thereof form no part of the present invention.

Figure 2:
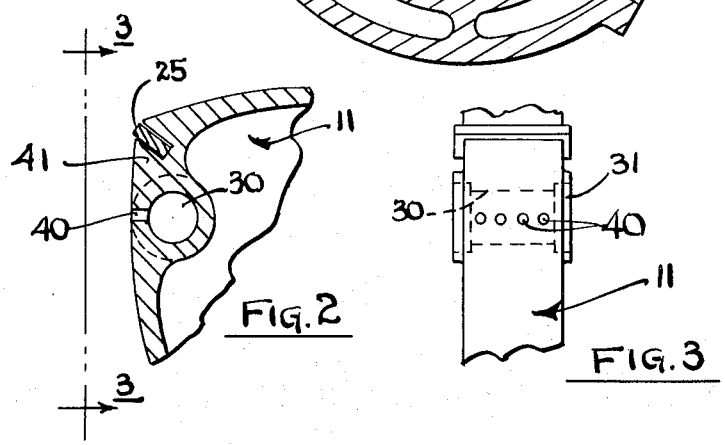
FIG. 2 is an enlarged cross sectional plan view illustrating the detonation suppression cavities of the embodiment of FIG. 1.
Figure 3:
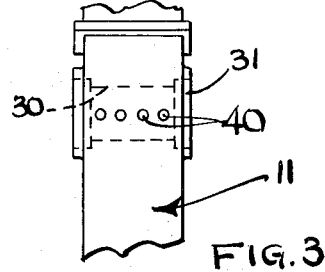
FIG. 3 is a view taken along the plane indicated by 3—3 in FIG. 2.

Referring now additionally to FIGS. 2 and 3, cylindrical cavities 30 are formed along the edges of rotor 11 adjacent to each of the seals thereof. These cavities may be formed by drilling out these portions of the rotor. A plug member 31 is preferably placed over the end of each cavity to provide a seal therefor. A pluraltiy of apertures 30 form neck portions of cavities 30 and extend from the surface of the rotor through to the cavities. The edge portion 41 of the rotor may be built up to additional thickness so the cavity can be made large enough to have the optimum acoustical properties for suppressing the detonation waves.

Cavities 30 in conjunction with neck portions 40 form acoustical Helmholtz cavities which as described in my aforementioned patents can be appropriately dimensioned to acoustically attenuate and thus supress the detonation waves produced in combustion. Plug members 31 may be eliminated to leave the ends of apertures 30 open, the chamber walls opposite these apertured portions provided a partial closure therefor.

Figure 9:
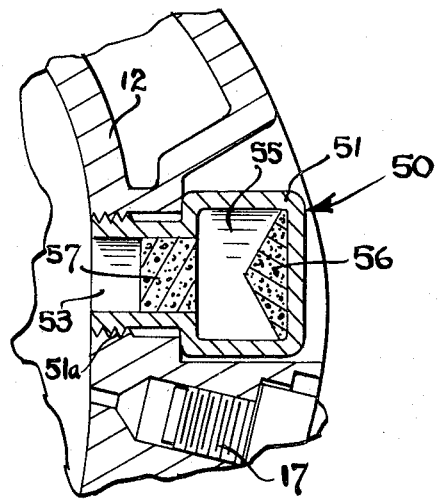
FIG. 9 is a cross sectional view illustrating the chamber wall installed suppressor of the embodiment of FIG. 1.

Aditional suppression may be provided by means of suppressor element 50 installed in the wall of chamber 12 adjacent to spark plug 17. The details of structure of suppressor element 50 are shown in FIG. 9. The suppressor includes a casing 51 which is threadably secured to chamber wall 12 by means of a threaded portion 51a. Supressor 50 has a neck portion 53 which provides fluid communication with the inside of the chamber and a cylindrical cavity portion 55. Cavity 55 and neck portion 53 are dimensioned to form a Helmholtz acoustical suppressor at the combustion vibration frequencies. A porous conical insert 56 may be installed in chamber 55, and/or a porous membrane 57 installed in neck portion 53, to broaden the tuning. Membrane 57 and insert 56 may be fabricated of porous sintered metal.

Insert element 50 is broadly tuned to ameliorate the undesired detonation waves developed in the ever-changing odd-shaped annulus formed between the rotor and the chamber wall in the vicinity of the suppressor element. It is to be noted that the suppressor elements both in the rotor and the chamber walls are preferably placed at positions of high acoustical impedance of the combustion chamber waves to provide optimum suppression effects.

The dimensions for the various suppressor element cavities can be designed for optimum effect empirically by cold bench tests. I have found that this can be done by fabricating a simulated sealed off chamber having a clear plastic window thereon closing off the side of the stator and the rotor. The chamber can be acoustically excited with a damped, mismatched loudspeaker coupled through a hole in the plastic, a microphone bein similarly coupled in the chamber to measure the reduction in acoustical Q achieved for various positioning, dimensions and configurations for the suppressor elements.

Figure 4:
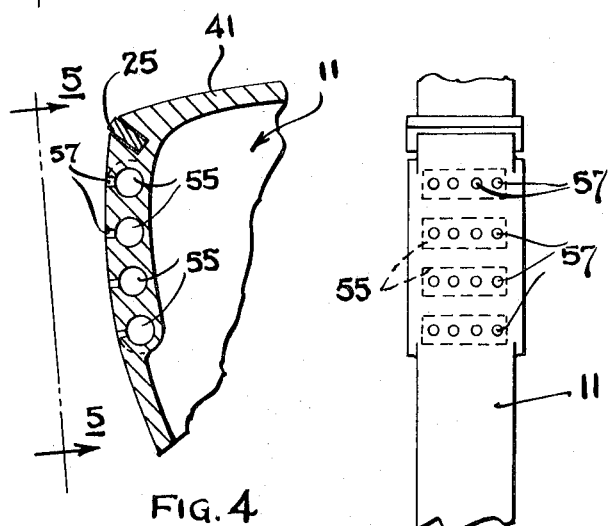
FIG. 4 is a cross sectional top plan view illustrating another embodiment of the invention.
Figure 5:
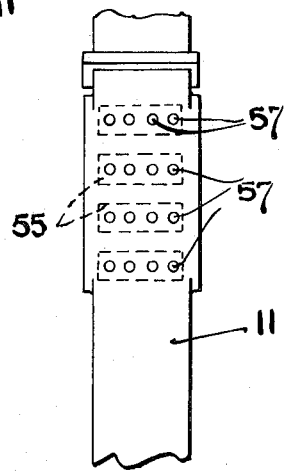
FIG. 5 is a view taken along the plane indicated by 5—5 in FIG. 4.

Referring next to FIGS. 4 and 5, another embodiment of the invention is illustrated. This embodiment utilizes a plurality of Helmholtz cavities 55 having neck portions 57 which extend through the edge of the rotor, these Helmholtz cavities being similar in design to that described in connection with FIGS. 1–3. A pluraltiy of such cavities are arranged adjacent to each of the three seals 25 of the rotor in the fashion illustrated in FIG. 4. The advantage of utilizing a plurality of such acoustical suppression elements is that it affords acoustical attenuation over an extended area of the rotor to better handle various gas vibration patterns. Also, the various cavities can be tuned to attenuate various frequencies of interest and thus more completely damp out all major unwanted vibration modes.

Figure 6:
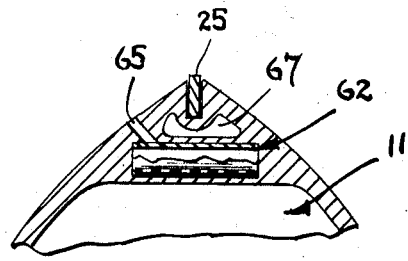
FIG. 6 is a cross sectional view illustrating a further embodiment of the invention.

Referring now to FIG. 6, a further embodiment of the invention is illustrated. In this embodiment the attenuator is in the form of a pipe section 62 which is cast into the rotor in the vicinity of each of seals 25. Fluid communication between pipe sections 62 and the chamber is provided by means of channel 65 drilled in the rotor wall and which extends to the inside of the pipe section. The dimensions of pipe volume 62 and channel portion 65 are designed so that they acoustically attenuate the unwanted vibration frequencies. A space 67 is provided behind seal 25 to provide cooling for the rotor region under the seal.

Figure 7:
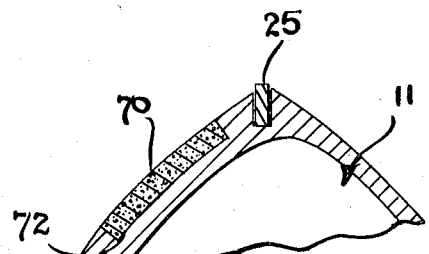
FIG. 7 is a cross sectional view of another embodiment of the invention.

Referring next to FIG. 7, still another embodiment of the invention is illustrated. In this embodiment the attenuator is formed by a sintered metal element 70 which is inserted in cavity 72 formed in the end walls of the rotor. The porosity of insert 70 is selected so as to give an attenuative response to the unwanted gas vibrations characteristic of the engine, the dimensions of the insert also being selected for optimum effect in this regard. As for the previous embodiments, an attenuating element 70 is preferably installed in the region of each of the three rotor seals.

Figure 8:
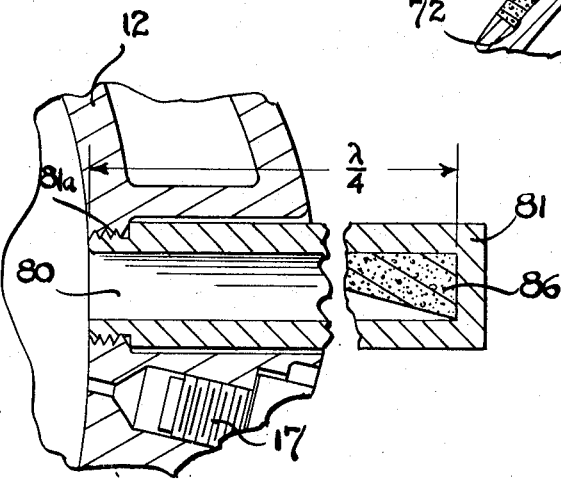
FIG. 8 is a cross sectional view illustrating a still further embodiment of the invention which is installed in the combustion chamber walls.

Referring now to FIG. 8, a further embodiment of the invention is illustrated, this embodiment being in the form of a plug insert which can be threadably attached to the chamber wall in the same general fashion as in the embodiment described in connection with FIG. 9. For maximum effectiveness the plugs 80 can be located in pairs so as to pick up the corner regions of each chamber adjacent the seal at combustion wave maximum occurrence. This embodiment comprises a chamber 80 formed by a cylindrical wall portion 81, wall portion 81 being threadably attached to chamber wall 12 by means of threaded portions 81a thereof. The length of chamber 80 is dimensioned so that it is equivalent to a quarter of a wavelength at the frequency of the gas vibrations to be suppressed. A wedge portion 86 formed of porous sintered metal is installed in chamber 80 to effectively broaden the frequency response of the chamber 80.

It is to be noted that it is desirable to make units of this type utilizing porous inserts removable in view of the fact that such inserts tend to become contaminated by engine combustion products after they have been utilized for periods of time. The removable feature thus facilitates servicing and replacement of such units.

Figure 11:
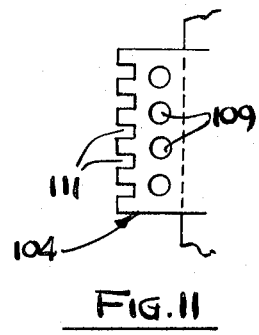
FIG. 11 is a side elevational view of the acoustic baffle of FIG. 10.
Figure 10:
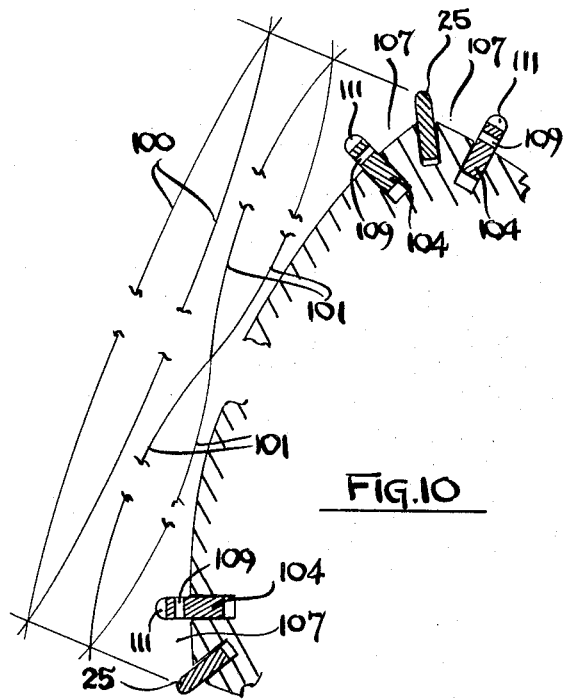
FIG. 10 is a cross sectional view illustrating an acoustic baffle which is peculiar to the rotary engine; and the wave pattern to be suppressed thereby.

FIGS. 10 and 11 shows another form of acoustic attenuator which is especially effective for a rotary combustion engine, and also shows a wave pattern 100 and 101 for which this particular attenuator is especially effective. In construction this attenuator 104 is arranged somewhat like an apex seal, and is located in parallel orientation adjacent the actual seal 25. The space 107 therebetween functions as the capacitance of the Helmholtz cavity response. The Helmholtz neck or inductance is provided by holes 109 or slots 111 which may be used in combination as shown, or either type may be used simply. The inductance of these apertures in matching combination with said capacitance 107 provides the frequency response for said wave pattern 100 and 101. The attenuation is provided primarily by resistive impedance of the apertures at the combustion vibration pattern frequency.

It will be noted that peculiar to a rotary combustion engine, the wave pattern 100 or 101 is like that of an organ pipe. It is a longitudinal mode. This means that there is always a particularly well defined high impedance region adjacent each apex seal, for all longitudinal patterns, including their overtones. Moreover, because the distance between the seals is a constant, this pattern tends to stay well defined during the combustion phase of the rotary cycle. Therefore this version of parallel acoustic baffle 104 can extend laterally clear across the end of the organ pipe, and yet does not require a large volume of the combustion space. The rotary combustion engine is really unique as regards this invention, because of the geometric arrangement of the apex seals, and the peculiar organ pipe mode of the combustion chamber acoustics.

There can be an acoustic baffle 104 on each side of each seal, if desired for maximum acoustic effectiveness. However in aid of minimum port size in the stator, a baffle can be on one side of the seal only.

The device of this invention thus provides means for attenuating the combustion associated pressure waves generated in a rotary engine so as to improve the performance thereof and lessen the wear occasioned by such pressure vibrations.

While the device of this invention has been described and illustrated in detail, it is to be clearly understood that this is intended by way of illustration and example only and is not to be taken by way of limitation, the spirit and scope of this invention being limited only by the terms of the following claims.

I claim:

1. A rotary internal combustion engine comprising:
   a combustion chamber,
   a rotor supported for orbital rotation around the walls of said chamber, said rotor having a plurality of spaced seals thereon which partially define the combustion chamber volume of said engine, the combustion chamber volume cyclically changing with the rotation of said rotor,
   means for causing combustion of gas in said chamber to orbitally drive said rotor, and
   acoustical attenuator means for suppressing unwanted gas vibrations resulting from said combustion, said attenuator means comprising a separate acoustical attenuator placed adjacent to each of said seals.

2. The device of claim 1 wherein said attenuators each comprises a cavity formed near the periphery of said rotor having neck portions formed by apertures extending from said cavity through the side walls of said rotor, said cavities and neck portions forming Helmholtz cavities.

3. The device of claim 2 wherein there are a plurality of said Helmholtz cavities adjacent to each of said seals.

4. The device of Claim 2 further including plug means for sealing the ends of said Helmholtz cavities.

5. The device of Claim 1 wherein said attenuator means comprises porous metal inserts, cavities being formed in said rotor adjacent to each of said seals for receiving said inserts.

6. The device of Claim 1 wherein said attenuator means comprises a pipe section installed in said rotor adjacent to each of said seals and aperture means providing fluid communication between the inside of said pipe section and said combustion chamber.

7. The device of Claim 1 wherein said separate acoustic attenuator is an apertured acoustically responsive baffle oriented substantially parallel to each apex seal.

* * * * *